United States Patent
Grimm et al.

(10) Patent No.: US 7,051,781 B2
(45) Date of Patent: May 30, 2006

(54) SUNSHADE ASSEMBLY FOR A VEHICLE ROOF

(75) Inventors: Rainer Grimm, Frankfurt (DE); Thomas Becher, Rodgau (DE); Christian Biewer, Munster (DE); Horst Bohm, Frankfurt (DE)

(73) Assignee: ArvinMeritor GmbH (DE)

( * ) Notice: Subject to any disclaimer, the term of this patent is extended or adjusted under 35 U.S.C. 154(b) by 0 days.

(21) Appl. No.: 10/886,012

(22) Filed: Jul. 7, 2004

(65) Prior Publication Data

US 2005/0189794 A1   Sep. 1, 2005

(30) Foreign Application Priority Data

Jul. 11, 2003   (DE) ................ 103 31 514

(51) Int. Cl.
*B60J 1/20*   (2006.01)
(52) U.S. Cl. .................... 160/265; 296/214
(58) Field of Classification Search ............. 296/214, 296/219 US, 219; 160/265, 267.1, 313, 160/370.22, 310
See application file for complete search history.

(56) References Cited

U.S. PATENT DOCUMENTS

| | | | |
|---|---|---|---|
| 4,923,244 A | 5/1990 | Clenet | |
| 6,003,920 A * | 12/1999 | Crisp | 296/37.1 |
| 6,491,332 B1 * | 12/2002 | De Ceuster | 296/37.16 |
| 6,899,380 B1 * | 5/2005 | Kralik et al. | 296/214 |
| 2002/0050327 A1 | 5/2002 | Churchfield | |
| 2003/0006630 A1 | 1/2003 | Kralik et al. | |
| 2003/0094249 A1 | 5/2003 | Zimmermann et al. | |

FOREIGN PATENT DOCUMENTS

| | | |
|---|---|---|
| DE | 42 00 422 A1 | 7/1993 |
| DE | 43 20 393 A1 | 12/1994 |
| JP | 2001055046 | 2/2001 |

OTHER PUBLICATIONS

European Search Report, Oct. 15, 2004.

* cited by examiner

*Primary Examiner*—Dennis H. Pedder
(74) *Attorney, Agent, or Firm*—Carlson, Gaskey & Olds

(57) ABSTRACT

A sunshade assembly for a vehicle roof has a window shade that is movable along guide rails toward the front and rear of the vehicle. Drive elements are connected to a front edge of the window shade, and rotatable tension wheels are mounted to the guide rail and coupled with the drive elements to pull taut a front portion of the window shade disposed between the front edge and the tension wheels.

16 Claims, 4 Drawing Sheets

SUNSHADE ASSEMBLY FOR A VEHICLE ROOF

REFERENCE TO RELATED APPLICATIONS

The present invention claims the benefit of German Patent Application No. 103 31 514.4, filed Jul. 11, 2003.

TECHNICAL FIELD

The invention relates to a sunshade assembly for a vehicle roof.

BACKGROUND OF THE INVENTION

A sunshade assembly for a vehicle roof often includes a sunshade blind which is associated with a light-transmitting (e.g., transparent or translucent) opening in the vehicle roof. The light-transmitting opening may be, for instance, a stationary panoramic window or also a transparent cover of a sliding roof. The sunshade blind can be shifted between an open position, where it does not hinder the passage of light through the opening, and a closed position, where it diminishes or completely blocks incident light radiating through the opening. Depending on the specific sunshade blind construction, the sunshade blind can be secured in various intermediate positions between the closed and open positions.

Conventional sunshade blinds use a sunshade made from cloth or other flexible material. The sunshade is wound around a shaft when it is in the open position. The shaft necessarily has to be straight so that it can be rotated to wind the sunshade. Because a vehicle roof usually is arched, however, the shaft profile greatly restricts head room within a passenger compartment of the vehicle.

It is therefore the object of the invention to create a sunshade assembly that allows sufficient head room in the passenger compartment of the vehicle without sacrificing the adjustability of the sunshade.

SUMMARY OF THE INVENTION

The invention is generally directed to a sunshade assembly for a vehicle roof. The sunshade assembly comprises first and second guide rails, a window shade that is movable along the guide rails toward the front and rear of the vehicle, first and second window shade drive elements that are at least partially movable along the guide rails and are connected to a front edge of the window shade, and first and second rotatable tension wheels that are mounted to be stationary with respect to the guide rails. The tension wheels are coupled with the drive elements such that a front window shade portion disposed between the window shade front edge and the tension wheels is held taut. This makes it possible to stow away the remaining part of the window shade (i.e., a rear window shade portion between the rear edge window shade and the tension wheels) in a suitable manner while maintaining as much head room as possible in the vehicle.

In one example, the rear window shade portion is disposed behind the tension wheels and can be loosely received in an accommodation space. Alternatively, it is also possible to receive the rear window shade portion in the shape of a coil. The coiled rear window shade portion can either be received on a separate winding body that is acted upon by a spring in a wind-up direction or can be directly wound on the tension wheels.

Advantageous designs of the invention will be apparent from the sub-claims.

BRIEF DESCRIPTION OF THE DRAWINGS

The invention will be described in the following with the aid of various embodiments which are illustrated in the attached drawings and in which.

DETAILED DESCRIPTION OF THE EMBODIMENTS

Figure 1:
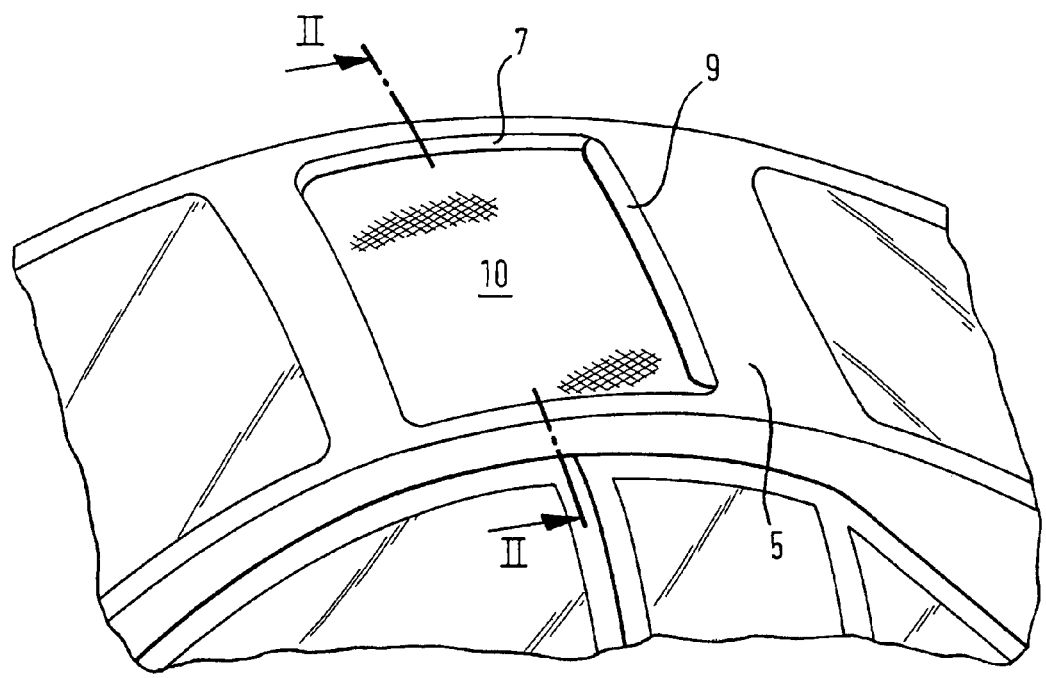
FIG. 1 shows in a perspective view a vehicle roof with a sunshade assembly according to one embodiment of the invention.

FIG. 1 schematically shows a vehicle roof 5 having a roof opening 7. The roof opening 7 can be closed in any known manner by a cover 9, which is shown in FIG. 1 in its opened position shifted to the rear with respect to the vehicle. The cover is made from a light-passing (e.g., transparent or translucent) material.

A window shade 10 is arranged underneath the cover 9. The window shade 10, together with components (explained below) that guide and operate the window shade 10, forms a sunshade assembly 11 (FIG. 3).

Figure 2:
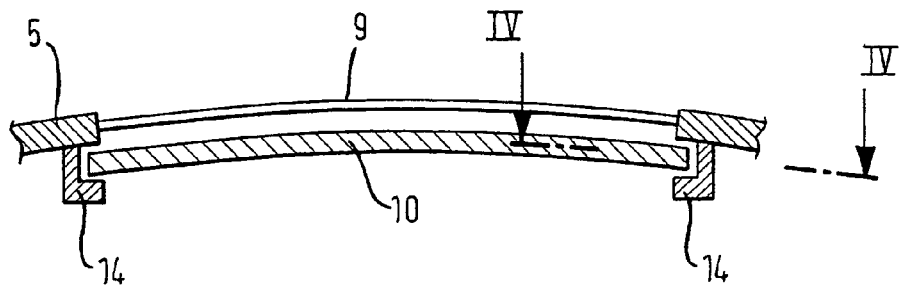
FIG. 2 is a section view taken along plane II—II of FIG. 1.
Figure 3:
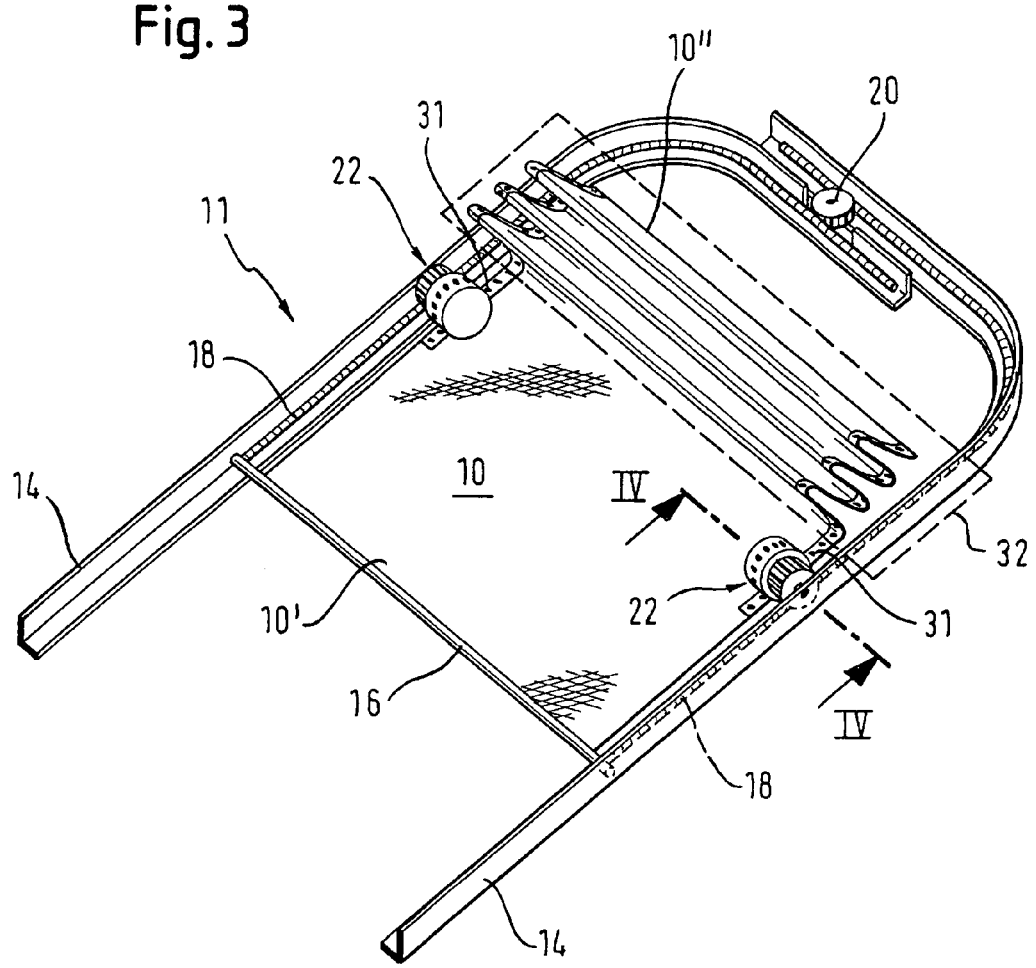
FIG. 3 is a perspective view of a sunshade assembly according to one embodiment of the invention.

As shown in FIGS. 2 and 3, the window shade 10 is movable along two guide rails 14, which are arranged along the lateral edges of the roof opening 7 and run in a longitudinal direction. A vehicular hoop 16 is movably arranged in the two guide rails 14. A front edge of the window shade 10 (with respect to the forward travel direction of the vehicle) is fastened to the vehicular hoop 16. Each end of the vehicular hoop 16 has a drive element 18 to drive the window shade 10 mounted to the vehicular hoop 16. In the illustrated examples, a cable that is guided to resist tension and bending is used as the drive element 18, and the cable is movably received in the guide rails 14.

The drive elements 18 may each have textured (e.g., corrugated or toothed) outer surface that engages a gear wheel 20, which is supported on the sunshade assembly 11 to be stationary and rotatable. The gear wheel 20 ensures that the two drive elements 18 move synchronously, such as when the window shade 10 is manually shifted with the vehicular hoop 16 in the guide rails 14. The gear wheel 20 may also connect an electric motor (not shown) to the drive elements 18 so that the electric motor can displace the drive elements 18 in the guide rails 14 toward the front and to the rear.

Figure 4:
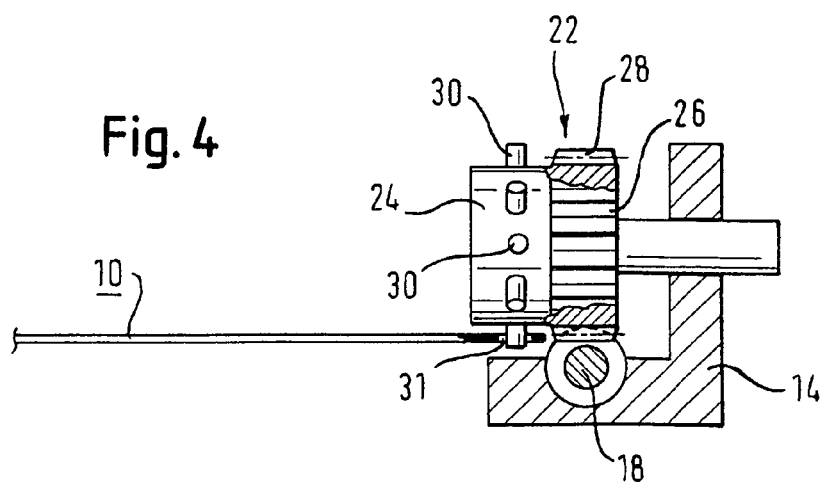
FIG. 4 is a section taken along plane IV—IV of FIG. 3.

Each guide rail 14 supports a rotatable tension wheel 22 in a stationary manner (FIGS. 3 and 4). The rotatable tension wheel 22 has a transport portion 24 and a drive pinion 26. The drive pinion 26 has a gear that engages with its corresponding drive element 18 so that the drive pinion 26 will rotate when translation al shifting of the drive elements 18 rotates the gear 28. The transport portion 24 of the tension wheel 22 has a plurality of regularly arranged, barb-like protrusions 30 provided on its circumference surface. The protrusions 30 engage openings 31 that are provided along the lateral edges of the window shade 10. As a result, rotation of the tension wheel 22 caused by translation al movement of the drive element 18 will be converted to translation al movement of the window shade 10.

The two tension wheels 22 define an imaginary dividing line that subdivides the window shade 10 in two distinct portions, namely a front portion 10' and a rear portion 10". The front and rear portions 10', 10" are defined with respect to a forward travel direction of the vehicle. The front portion 10' of the window shade 10 is held taut between the two tension wheels 22 and the vehicular hoop 16, by the two drive elements 18. During assembly of the sunshade assembly 11, the position of the two drive elements 18, and therefore the position of the vehicular hoop 16, will be adjusted relative to the two tension wheels 22 so that the front portion 10' of the window shade 10 will have the desired tension.

In the embodiment shown in FIG. 3, the rear portion 10" of the window shade 10 is received in an accommodation space 32. The accommodation space 32 is schematically represented in FIG. 3 with dotted lines. The rear portion 10" of the window shade 10 is disposed in the accommodation space 32 loosely and folds in a relatively random fashion. When the window shade 10 is pushed backward, the material released from the tension wheels 22 will simply gather in the accommodation space 32. When the window shade 10 is pulled forward, the window shade 10 is gripped by the tension wheels 22 and introduced into the guide rails 14. One particular advantage with receiving the rear portion 10" of the window shade 10 in this manner is that the accommodation space 32 can be configured with almost any cross-sectional profile in the transverse direction. For example, the accommodation space 32 may have a cross-sectional profile with a slight curvature to provide a particularly large clearance underneath the sunshade assembly 11.

Figure 8:
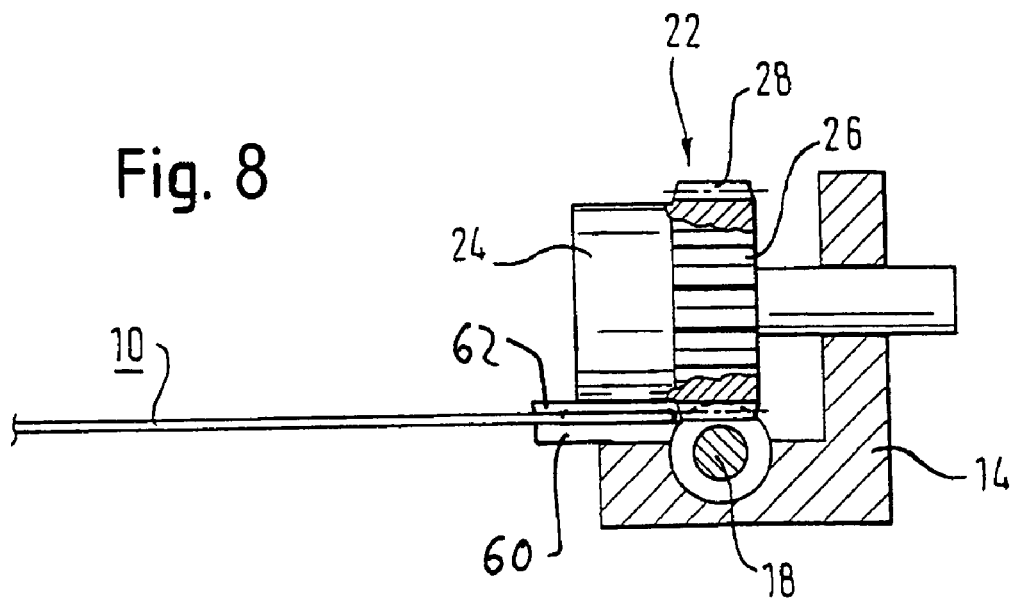
FIG. 8 is a schematic section view of another embodiment of the invention.

The lateral edges of the window shade 10 may be reinforced, particularly around the openings 31. As shown in FIG. 8, reinforcements 60, 62 may be disposed in the areas of the window shade 10 that contact the transport portion 24. In this way, the window shade 10 can be held taut in a transverse direction as well as in the longitudinal direction.

Note that the transport portion 24 of the tension wheels 22 may be formed to have a substantially flat circumference surface instead of having the protrusions 30, as shown in FIG. 8. In this embodiment, the circumference surface of the transport portion 24 frictionally engages the corresponding lateral edge of the window shade 10 to move the window shade 10.

Figure 5:
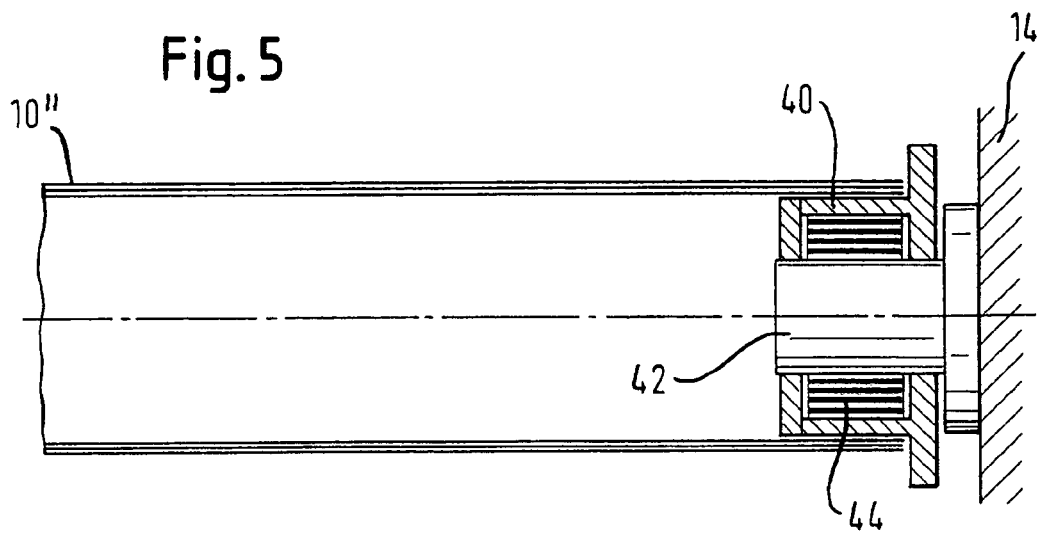
FIG. 5 is a broken section view a variation of the embodiment shown in FIG. 3.

FIG. 5 illustrates a detail of a variation of the embodiment described above. Unlike in the first embodiment, the rear portion 10" of the window shade 10 in the embodiment shown in FIG. 5 is wound in a controlled fashion rather than being loosely and randomly received in the accommodation space 32. As shown in FIG. 5, the rear portion 10" of the window shade 10 is wound on two winding bodies 40 that are mounted on the guide rails 14 to lie opposite each other.

In the illustrated example, the winding bodies 40 are rotatable on a bearing boss 42 mounted to the guide rail 14. A spiral winding spring 44 is arranged between each bearing boss 42 and each winding body 40, and a biasing force of each winding spring 44 acts upon its corresponding winding body 40 in a selected wind-up direction. A rear edge of the rear portion 10" of the window shade 10 is fastened to the two winding bodies 40 in any appropriate known manner.

When the window shade 10 is pushed back, the rear portion 10" of the window shade 10 is released by the tension wheels 22 and is automatically wound up on the winding bodies 40 by the biasing force of the winding springs 44. Because the two winding bodies 40 are disposed only at the lateral edges of the window shade 10, the coil formed by the window shade 10 when it is wound on the winding bodies 40 is hollow inside, making it flexible. Thus, the coiled window shade 10 can be supported by any suitable guiding element (not shown) to provide a particularly large clearance underneath the sunshade assembly 11.

Figure 6:
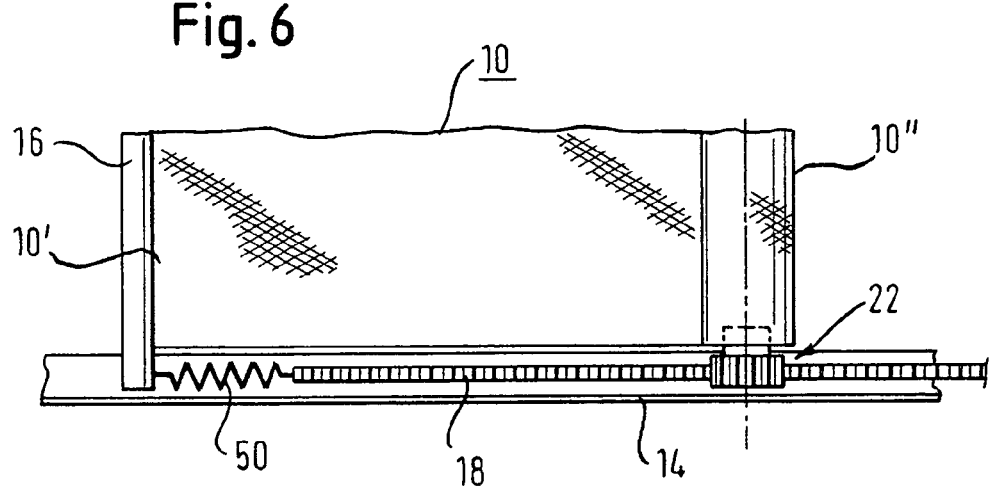
FIG. 6 is a schematic, broken view of a sunshade assembly according to another embodiment of the invention.

FIG. 6 is a schematic illustrating the sunshade assembly according to another embodiment of the invention. In this embodiment, the rear portion 10" of the window shade 10 is not received behind the tension wheels 22. Instead, the rear portion 10" is wound directly on the two tension wheels 22. To do this, the rear edge of the window shade 10 is fastened directly to the transport portion 24 of each of the tension wheels 22. When the tension wheels 22 are rotated by shifting the drive elements 18, the window shade 10 is wound or unwound corresponding to the direction of rotation. Also in this case, the vehicular hoop 16 and the drive elements 18 holds the front portion 10' of the window shade 10 taut.

However, as the diameter of the coil formed on the tension wheels 22 by the window shade 10 changes as a function of the amount of the window shade material wound thereon, the length of the wound or unwound window shade 10 will also change for every rotational angle of the tension wheels 22. Thus, in the case where the window shade 10 is pushed almost completely to the rear and with a correspondingly thick coil, a predetermined shifting of the drive elements 18 will result in that a larger length of window shade material that is wound up or unwound, as compared to when the window shade is almost entirely pushed to the front with a correspondingly thinner coil. In other words, the shifting speed of the front portion 10', and consequently the shifting speed of the vehicular hoop 16, varies during shifting the window shade 10, assuming a constant shifting speed of the drive elements 18.

To compensate for the varying shifting speeds, a length balancing element, such as a pressure spring 50, may be included in the sunshade assembly 11. The pressure spring 50 is arranged between the drive elements 18 and the vehicular hoop 16 and pre-tensions the rear portion 10" of the window shade 10. At the same time, the pressure spring 50 takes up the relative movement between the drive elements 18 and the vehicular hoop 16 during shifting of the window shade 10.

Figure 7:
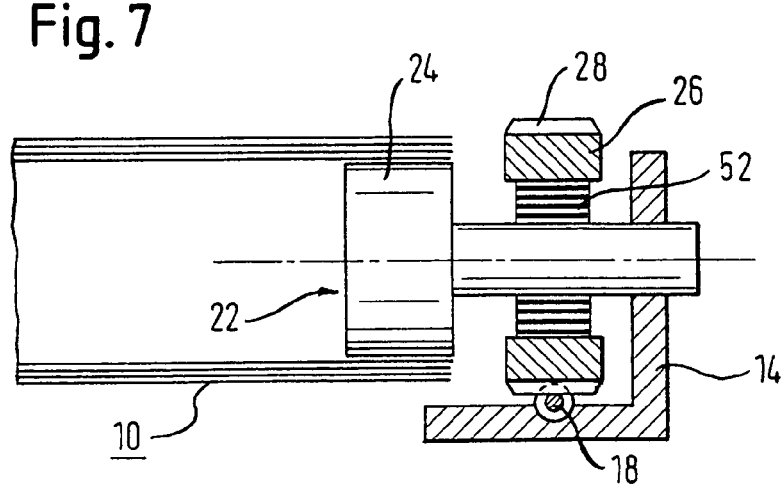
FIG. 7 is a schematic section view of a variation of the embodiment shown in FIG. 6.

FIG. 7 illustrates a variation of the embodiment shown in FIG. 6. In this embodiment, a spiral spring 52 acts as the length balancing element. The spiral spring 52 is effective between the drive pinion 26 of the tension wheel 22 and the transport portion 24. The spiral spring 52 provides the necessary pretensions of the front portion 10' of the window shade 10 and also compensates for the relative movement between the transport portion 24 and the drive pinions 26 that arises during shifting of the window shade 10. Shifting may occur because the transport portion 24 is coupled with the drive elements 18 through the window shade 10 and the vehicular hoop 16 while the drive pinions 26 are directly coupled with the drive elements 18.

It should be understood that various alternatives to the embodiments of the invention described herein may be employed in practicing the invention. It is intended that the following claims define the scope of the invention and that the method and apparatus within the scope of these claims and their equivalents be covered thereby.

The invention claimed is:

1. A sunshade assembly for a vehicle roof, comprising:
first and second guide rails;
a window shade that is movable along the first and second guide rails;
first and second drive elements that are at least partially movable along the first and second guide rails and that are connected to a front edge of the window shade wherein at least one of the first and second drive elements is a drive cable; and
first and second rotatable tension wheels mounted on the first and second guide rails, respectively, wherein the first and second rotatable tension wheels are respectively coupled with the first and second drive elements to hold taut a front portion of the window shade disposed between the front edge and the first and second rotatable tension wheels wherein at least one of the first and second rotatable tension wheels has a drive pinion that engages with the drive cable.

2. A sunshade assembly for a vehicle roof, comprising:
first and second guide rails;
a window shade that is movable along the first and second guide rails;
first and second drive elements that are at least partially movable along the first and second guide rails and that are connected to a front edge of the window shade; and
first and second rotatable tension wheels mounted on the first and second guide rails, respectively, wherein the first and second rotatable tension wheels are respectively coupled with the first and second drive elements to hold taut a front portion of the window shade disposed between the front edge and the first and second rotatable tension wheels and wherein at least one of the first and second rotatable tension wheels has a transport portion having at least one protrusion on a circumference, and wherein the window shade has at least one lateral edge with at least one opening adapted to be engaged by said at least one protrusion.

3. A sunshade assembly for a vehicle roof, comprising:
first and second guide rails;
a window shade that is movable along the first and second guide rails;
first and second drive elements that are at least partially movable along the first and second guide rails and that are connected to a front edge of the window shade; and
first and second rotatable tension wheels mounted on the first and second guide rails, respectively, with the first and second rotatable tension wheels each being rotatable about an axis that extends transversely to a direction of movement of the window shade, wherein the first and second rotatable tension wheels are respectively coupled with the first and second drive elements to hold taut a front portion of the window shade disposed between the front edge and the first and second rotatable tension wheels and wherein at least one of the first and second rotatable tension wheels has a transport portion having a substantially flat circumferential surface that frictionally engages a corresponding lateral edge of the window shade.

4. The sunshade assembly according to claim 1, further comprising a reinforcement disposed on at least one lateral edge of the window shade.

5. The sunshade assembly according to claim 1, further comprising a vehicular hoop mounted at the front edge of the window shade, wherein at least one of the first and second drive elements engages the vehicular hoop.

6. The sunshade assembly according to claim 1, wherein the drive cable is guided by at least one of the first and second guide rails to resist tension and bending.

7. The sunshade assembly according to claim 1, further comprising a gear wheel, wherein the drive cable has a textured surface that engages the gear wheel.

8. The sunshade assembly according to claim 1, wherein a rear portion of the window shade disposed behind the first and second rotatable tension wheels is received in an accommodation space.

9. The sunshade assembly according to claim 1, wherein a rear portion of the window shade disposed behind the first and second rotatable tension wheels is stored in the shape of a coil.

10. The sunshade assembly according to claim 9, further comprising first and second winding bodies coupled to the first and second guide rails, respectively, wherein the coil has first and second lateral edges respectively received on the first and second winding bodies.

11. The sunshade assembly according to claim 10, wherein at least one of the first and second winding bodies is biased by a spring in a wind-up direction.

12. A sunshade assembly for a vehicle roof, comprising:
first and second guide rails;
a window shade that is movable along the first and second guide rails;
first and second drive elements that are at least partially movable along the first and second guide rails and that are connected to a front edge of the window shade; and
first and second rotatable tension wheels mounted on the first and second guide rails, respectively, wherein the first and second rotatable tension wheels are respectively coupled with the first and second drive elements to hold taut a front portion of the window shade disposed between the front edge and the first and second rotatable tension wheels wherein a rear portion of the window shade disposed behind the first and second tension wheels is stored in the shape of a coil and wherein the coil is wound directly on the first and second rotatable tension wheels.

13. The sunshade assembly according to claim 12, further comprising a length balancing element coupled to the window shade to compensate for a varying winding length of the window shade as a diameter of the coil varies.

14. The sunshade assembly according to claim 13, wherein the length balancing element is a pressure spring disposed between at least one of the first and second drive elements.

15. The sunshade assembly according to claim 13, wherein at least one of the first and second rotatable tension wheels comprises a drive pinion and a transport portion, and wherein the length balancing element is a spiral spring arranged between the drive pinion and the transport portion.

16. The sunshade assembly according to claim 3, wherein the transport portion directly engages at least one of an upper and lower surface of the window shade.

* * * * *